United States Patent Office 3,060,168
Patented Oct. 23, 1962

3,060,168
WATER-INSOLUBLE DISAZO-DYESTUFFS
Hans Wilhelm Liechti, Oberwil, near Basel, Switzerland, assignor to Ciba Limited, Basel, Switzerland
No Drawing. Filed July 12, 1960, Ser. No. 42,245
Claims priority, application Switzerland July 17, 1959
5 Claims. (Cl. 260—186)

This invention provides new disazo-dyestuffs which are free from groups imparting solubility in water and correspond to the general formula (1)      A—N=N—B—N=N—D in which A and D each represent a benzene radical, and B represents a benzene or naphthalene radical, at least one of the said radicals containing a cyanalkoxy group, especially a β-cyanethoxy group, or a cyanalkyl-mercapto group, and in which the benzene radical D contains a hydroxyl group in para-position to the azo linkage.

The invention also provides a process for the manufacture of the dyestuffs of the Formula 1 wherein a diazo-compound of an amino-azo-dyestuff of the general formula (2)         A—N=N—B—NH₂ is coupled with a coupling component of the oxy-benzene series capable of coupling substantially in para-position to the hydroxyl group, and the components are so chosen that the disazo-dyestuff so obtained contains at least one cyanalkyl-mercapto or more especially a cyanalkoxy group.

For making the dyestuffs the components used are, therefore, advantageously so chosen that a cyanalkoxy or cyanalkyl-mercapto group is bound to at least one of the benzene radicals A, B and D. In general it is sufficient for the dyestuff to contain a single cyanalkoxy or cyanalkyl mercapto group, that is to say only one such group is bound to one of the radicals A, B and D.

In addition to the substituents mentioned above, the dyestuffs or the components used to make them may contain further substituents not imparting solubility in water. Of special interest as diazo-compounds of the Formula 2 are those amino-azo-dyestuffs which contain as further substituents at most halogen atoms or alkyl or further alkoxy groups and, if desired, a nitro group in the radical A.

The dyestuffs of the Formula 2 can be obtained by coupling the diazo-compound of an amine of the benzene series, as initial component with an aminobenzene or an aminonaphthalene which is free from acid groups imparting solubility in water and is capable of coupling in the para-position, as middle component.

As suitable initial components there may be mentioned aniline and also derivatives thereof substituted in the nucleus by methyl, ethyl, methoxy or ethoxy groups. Of special interest are amino benzenes which contain a cyanalkoxy group, more especially in meta- or para-position to the amino group, and especially a cyanethoxy group, or a cyanalkyl-mercapto group. As examples there may be mentioned the amines of the formulae:

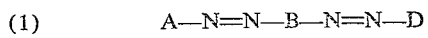

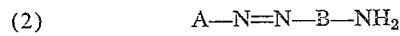

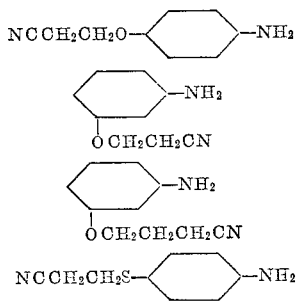

As middle components there may be used, for example, amino naphthalenes such as 1-aminonaphthalene, 1-amino-5- or -8-chloronaphthalene and especially amino benzenes, for example, aniline, 2-chloraniline, 2- and 3-methoxy-, or 2- and 3-ethoxy-, or cyanethoxy aniline, 2:5-dimethoxy-aniline, 2:5-diethoxy-aniline, 2:5-dicyanethoxy aniline, 2- or 3-methyl aniline, 2:5-dimethyl aniline, 2-methoxy-5-methyl aniline, 2-ethoxy-5-methyl aniline or 2-cyanethoxy-5-methylaniline. The couplings are advantageously carried out in a weakly acid to weakly alkaline medium, for example, in a medium rendered acid with acetic acid or alkaline with bicarbonate. When the middle component has a low coupling power, it is generally of advantage to couple it in the form of its ω-methane sulfonic acid, and subsequently to split off the ω-methane sulfonic acid group. This applies, for example, to 1-amino-2-β-cyanethoxy benzene. The diazotization of the amino-azo-dyestuffs of the Formula 2 can usually be carried out by methods in themselves known, for example, with the use of hydrochloric acid and sodium nitrite. The diazo-monoazo-compounds so obtained are then coupled with the end components in an alkaline medium, for example, a medium rendered alkaline with an alkali metal carbonate and, if desired, with the addition of an agent that assists coupling, such as pyridine or picoline.

As end components there may be mentioned hydroxybenzene capable of coupling in para-position, for example hydroxybenzene itself, 2- or 3-methyl-1-hydroxybenzene, 2-chloro-1-hydroxybenzene, 2- or 3-methoxy-1-hydroxybenzene, 2- or 3-β-cyano-ethoxy-1-hydroxybenzene, or 2:5-dimethyl-1-hydroxybenzene or 3:5-dimethyl-1-hydroxybenzene.

When 2- or 3-β-cyanethoxy-1-hydroxybenzene is used as end product, there may be used a diazo-compound of an amino-azo-dyestuff of the Formula 2, which contains no cyanalkoxy groups. This can be obtained in known manner, for example, by coupling the diazo-compound of one of the above-named initial components free from cyanalkoxy groups with one of the middle components named above that are free from cyanalkoxy groups. Aminobenzenes substituted by a cyanethoxy group can be obtained, for example, from nitro-hydroxybenzenes by heating the latter in aqueous solution in the presence of a basic catalyst, for example, Triton B (benzyl-trimethyl-ammonium hydroxide), with acrylonitrile under superatmospheric pressure at a temperature above 100° C., for example, in the region of 115–125° C. By the reduction of the nitro group the corresponding amines are obtained. Aminobenzenes substituted by a cyanethyl mercapto group can also be obtained by the additive combination of acrylonitrile with an appropriate nitro-thiophenol and reducing the nitro group. As nitro-thiophenols are substantially more reactive than nitro-phenols, the additive combination of acrylonitrile takes place without a catalyst.

The new disazo-dyestuffs are very suitable, especially after being subjected to a pasting operation which may be coupled with reprecipitation, for example, from sulfuric acid, for dyeing and printing structures and especially fibers of polyesters, for example, polyethylene terephthalates. By the usual dyeing methods, for example, from a dyeing liquor which contains a dispersion of the dyestuff and advantageously a dispersing agent, at a temperature near 100° C., if desired with the addition of a swelling agent or at a temperature above 100° C. with the use of superatmospheric pressure, there are obtained pure generally strong orange to scarlet dyeings capable of being discharged, and which are distinguished by their especially good fastness to light and sublimation. Further, the new dyestuffs can also be used for dyeing or printing structures of cellulose esters or ethers, polyamides or polyurethanes or polyvinyl chloride, or they can be used as pigments.

The following examples illustrate the invention, the parts and percentages being by weight.

*Example 1*

16.2 parts of 4-amino-1-β-phenoxypropionic acid nitrile are diazotized in known manner and coupled in acetic acid solution with 10.7 parts of 1-amino-3-methyl-benzene. The aminomonoazo dyestuff produced is separated, suspended in dilute hydrochloric acid and diazotized with sodium nitrite at 20° C. The diazo solution, filtered with active carbon, is allowed to flow at a temperature of 5 to 10° C. into a solution of 9.4 parts of hydroxybenzene in 100 parts of water, 10 parts of sodium hydroxide solution of 30% strength and 20 parts of sodium carbonate. In this process, immediate coupling with the diazo dyestuff occurs. The latter is filtered off, washed with water until a neutral reaction is obtained and dried.

The new water-insoluble dyestuff of the formula

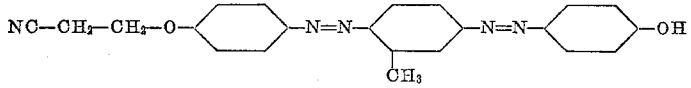

is a brown powder which, in fine dispersion, dyes acetate silk, triacetate silk and polyamide fibers, such as nylon and Perlon, in reddish-yellow shades having excellent fastness properties. In particular, however, the new dyestuff colors polyester fibers in reddish-yellow shades having outstanding sublimation fastness.

Dyestuffs which color said fibers in orange shades having the same excellent properties are obtained if 1-amino-2:5-dimethylbenzene or 1-amino-2-methoxy-5-methylbenzene is employed as middle constituent instead of 1-amino-3-methylbenzene.

If 1-amino-2:5-dimethoxybenzene or 1-amino-2:5-diethoxybenzene is chosen as middle constitutent, dyestuffs are obtained which dye said fibers in scarlet shades having the same excellent properties.

*Example 2*

9.3 parts of aminobenzene are diazotized and coupled in acetic acid solution with 17.6 parts of 2-amino-4-methyl-1-β-phenoxypropionic acid nitrile. The aminomonoazo dyestuff produced is separated, suspended in dilute hydrochloric acid and diazotized with sodium nitrite at 20° C. The diazo solution, filtered with active carbon, is allowed to flow at a temperature of 5 to 10° C. into a solution of 9.4 parts of hydroxybenzene in 100 parts of water, 10 parts of sodium hydroxide solution of 30% strength and 20 parts of sodium carbonate. In this process, immediate coupling with the diazo dyestuff occurs. The latter is filtered off, washed with water until a neutral reaction is obtained and dried.

The new water-insoluble dyestuff of the formula

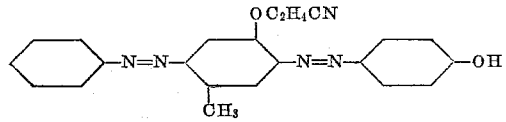

is a brown powder which, in fine dispersion, dyes acetate silk, triacetate silk and polyamide fibers in orange shades having excellent fastness properties. In particular, however, the new dyestuff colors the polyester fibers in orange shades having outstanding sublimation fastness.

Dyestuffs having the same excellent properties are obtained if 2-methyl-1-hydroxybenzene or 3-methyl-1-hydroxybenzene is used as final constituent instead of hydroxybenzene.

If 2-methoxy-1-hydroxybenzene or 3-methoxy-1-hydroxy-benzene is chosen as final constituent, dyestuffs are obtained which dye said fibers in red shades having the same excellent properties.

*Example 3*

17.8 parts of β-(para-aminophenylmercapto)-propionitrile are diazotized in known manner and coupled in acetic acid solution with 15.3 parts of 2:5-dimethoxy-1-amino-benzene. The aminomonoazo dyestuff produced is separated, suspended in dilute hydrochloric acid and diazotized with sodium nitrite at 20° C. The diazo solution, filtered with active carbon, is combined at a temperature of 5 to 10° C. with a sodium-carbonate-alkaline solution of 9.4 parts of hydroxybenzene. In this process, immediate coupling with the diazo dyestuff occurs. The latter is filtered off, washed with water until a neutral reaction is obtained and dried.

The new water-insoluble dyestuff of the formula

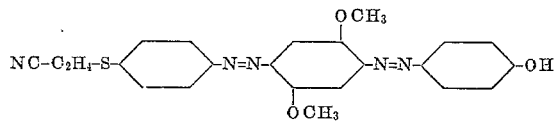

is a brown powder which, in fine dispersion, dyes acetate silk, triacetate silk and polyamide fibers in scarlet shades having excellent fastness properties. In particular, however, the new dyestuff dyes the polyester fibers in scarlet shades having outstanding sublimation fastness.

If 1-amino-3-methylbenzene, 1-amino-2:5-dimethylbenzene or 1-amino-2-methoxy-5-methylbenzene is chosen as middle constituent, dyestuffs are obtained which dye said fibers in orange shades having the same excellent properties.

The β-(para-aminophenylmercapto)-propionitrile used in this example as diazo constituent may be obtained by heating acrylonitrile with an aqueous solution of sodium-para-nitrothiophenolate and subsequent reduction of the nitro group.

*Example 4*

1 part of the dyestuff according to Example 1, paragraph 1, is wet-ground with 2 parts of an aqueous solution of sulfite pulp waste liquor or 50% strength and dried.

This dyestuff preparation is mixed with 40 parts of an aqueous solution of 10% strength of a condensation product of octadecyl alcohol with 20 mols of ethylene oxide and 4 parts of an acetic acid solution of 40% strength are added. A dyebath of 4,000 parts is prepared therefrom by dilution with water.

100 parts of a purified polyester fibrous material are entered into this bath at 50° C., the temperature is increased in half an hour to 120 to 130° C. and dyeing is carried out at this temperature for one hour in a closed vessel. The material is thereafter rinsed well. A strong, brilliant orange dyeing having good light fastness and very good sublimation fastness is obtained.

If dyeing is carried out in a dyebath containing 8 parts of soap instead of 4 parts of an acetic acid solution of 40% strength, a coloration corresponding exactly in intensity, color tone and fastness properties is obtained.

*Example 5*

100 parts of a purified polyester fibrous material are entered at 50° C. into a dyebath containing in 4,000 parts 12 parts of diammonium phosphate and 40 parts of an aqueous solution of 10% strength of a condensation product of octadecyl alcohol with 20 mols of ethylene oxide and treated for 15 minutes. A solution of 12 parts of orthophenyl phenol in dilute sodium hydroxide solution are thereafter added and treatment is carried out for another 15 minutes at 50 to 55° C.

A fine dispersion of 1 part of the dyestuff according to Example 1, paragraph 1, in 2 parts of an aqueous solution of sulfite pulp waste liquor of 50% strength is then added and the temperature is increased in half an hour to boiling point. Dyeing is then carried out for 1½ to 2 hours while boiling.

The dyed fiber is thereupon treated for 30 minutes at 60 to 70° C. in a bath containing 2 parts of sodium hydroxide solution of 30% strength and 10 parts of an aqueous solution of 10% strength of a condensation product of octadecyl alcohol with 20 mols of ethylene oxide in 1,000 parts of water and then rinsed. A strong brilliant orange dyeing having good light fastness and very good sublimation fastness is obtained which corresponds in intensity and shade to that produced according to Example 4.

What is claimed is:

1. A disazo-dyestuff of the formula

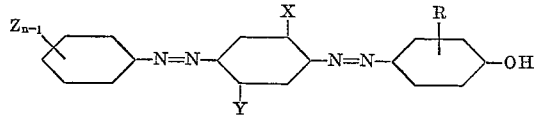

in which Z is a member selected from the group consisting of cyanethoxy and cyanethylmercapto, at least three nuclear carbon atoms being between Z and the nearest azo group, X and Y each represents a member selected from the group consisting of hydrogen, lower alkyl, lower alkoxy and cyanethoxy, R represents a member selected from the group consisting of hydrogen and lower alkyl and $n$ is a whole number ranging from 1 to 2, at least one of X, Y and Z being cyanethoxy.

2. The disazo-dyestuff of the formula

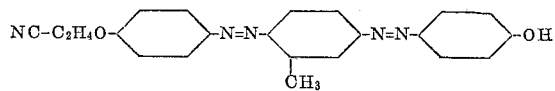

3. The disazo-dyestuff of the formula

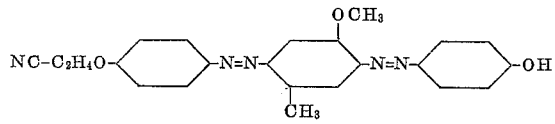

4. The disazo-dyestuff of the formula

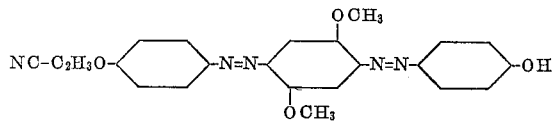

5. The disazo-dyestuff of the formula

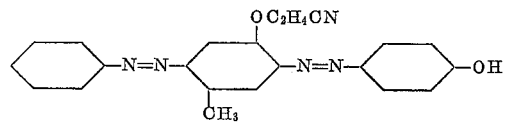

References Cited in the file of this patent
UNITED STATES PATENTS
2,134,521    Knight _____ Oct. 25, 1938